United States Patent
Tsuruga et al.

(10) Patent No.: US 12,306,917 B2
(45) Date of Patent: May 20, 2025

(54) INFORMATION PROCESSING APPARATUS, USER AUTHENTICATION NETWORK SYSTEM, AND USER AUTHENTICATION METHOD

(71) Applicant: MAXELL, LTD., Kyoto (JP)

(72) Inventors: Sadao Tsuruga, Kyoto (JP); Yasunobu Hashimoto, Kyoto (JP); Kazuhiko Yoshizawa, Kyoto (JP); Yoshinori Okada, Kyoto (JP)

(73) Assignee: MAXELL, LTD., Kyoto (JP)

( * ) Notice: Subject to any disclaimer, the term of this patent is extended or adjusted under 35 U.S.C. 154(b) by 718 days.

(21) Appl. No.: 17/275,076

(22) PCT Filed: Sep. 12, 2018

(86) PCT No.: PCT/JP2018/033885
§ 371 (c)(1),
(2) Date: Mar. 10, 2021

(87) PCT Pub. No.: WO2020/054002
PCT Pub. Date: Mar. 19, 2020

(65) Prior Publication Data
US 2021/0256104 A1    Aug. 19, 2021

(51) Int. Cl.
*H04L 29/06* (2006.01)
*G06F 3/16* (2006.01)
(Continued)

(52) U.S. Cl.
CPC ........... *G06F 21/32* (2013.01); *G06F 3/16* (2013.01); *G10L 17/06* (2013.01); *G10L 25/51* (2013.01); *G10L 25/78* (2013.01)

(58) Field of Classification Search
CPC . G06F 21/32; G06F 3/16; G10L 17/06; G10L 25/51; G10L 25/78
See application file for complete search history.

(56) References Cited

U.S. PATENT DOCUMENTS 6,941,269 B1 * 9/2005 Cohen ................ G10L 13/00
                                                704/275
8,369,495 B1 * 2/2013 Mallenahally Channakeshava ....
                                                H04M 3/4936
                                                379/88.23
(Continued)

FOREIGN PATENT DOCUMENTS

JP        10-20883 A     1/1998
JP        10-173644 A    6/1998
(Continued)

OTHER PUBLICATIONS

Huan Feng et al., Continuous Authentication for Voice Assistants, Oct. 4, 2017, ACM, pp. 343-355. (Year: 2017).*

(Continued)

*Primary Examiner* — Luu T Pham
*Assistant Examiner* — Fahimeh Mohammadi
(74) *Attorney, Agent, or Firm* — Rimon P.C.

(57) ABSTRACT

An information processing apparatus includes a voice input processing unit, a memory, and a controller. The voice input processing unit takes in voice of a user of the information processing apparatus to convert the voice into a first voice signal. The controller extracts a first voice feature from the first voice signal to compare it with voice features registered in the memory. When the first voice feature is not matched with any voice features, the controller executes a process for storing the first voice feature in the memory to be associated with the registration target user, a process for generating a voice password based on the first voice feature, and a process for storing the voice password in the memory. The controller executes user authentication processing for an authentication target user by using the voice password in the memory by the user registering process.

7 Claims, 7 Drawing Sheets

(51) Int. Cl.
*G06F 21/32* (2013.01)
*G10L 17/06* (2013.01)
*G10L 25/51* (2013.01)
*G10L 25/78* (2013.01)

(56) References Cited

U.S. PATENT DOCUMENTS

| | | | | |
|---|---|---|---|---|
| 2005/0089172 | A1* | 4/2005 | Fujimoto | G07C 9/37 |
| | | | | 380/275 |
| 2007/0129944 | A1* | 6/2007 | Luan | G10L 17/04 |
| | | | | 704/E17.006 |
| 2009/0254757 | A1* | 10/2009 | Toyama | G10L 17/10 |
| | | | | 704/E17.001 |
| 2010/0017209 | A1* | 1/2010 | Yu | G06F 21/32 |
| | | | | 704/E17.003 |
| 2013/0132091 | A1* | 5/2013 | Skerpac | G07C 9/37 |
| | | | | 704/273 |
| 2013/0298213 | A1* | 11/2013 | Macwan | G06F 21/32 |
| | | | | 726/7 |
| 2014/0343943 | A1* | 11/2014 | Al-Telmissani | G06F 21/32 |
| | | | | 704/246 |
| 2015/0161370 | A1* | 6/2015 | North | G07C 9/37 |
| | | | | 726/5 |
| 2015/0301733 | A1* | 10/2015 | Acevedo | G06F 3/04817 |
| | | | | 715/771 |
| 2016/0035350 | A1 | 2/2016 | Jung et al. | |
| 2017/0244701 | A1* | 8/2017 | Su | G06F 21/36 |
| 2018/0130475 | A1* | 5/2018 | Page | G10L 25/84 |
| 2019/0035407 | A1* | 1/2019 | Keret | G10L 17/24 |
| 2019/0349366 | A1* | 11/2019 | Dewan | H04L 41/0806 |
| 2019/0378520 | A1* | 12/2019 | Chiu | G10L 17/26 |

FOREIGN PATENT DOCUMENTS

| | | |
|---|---|---|
| JP | 2001-318692 A | 11/2001 |
| JP | 2003-066985 A | 3/2003 |
| JP | 2003-337801 A | 11/2003 |
| JP | 2005-128307 A | 5/2005 |
| JP | 2009-093256 A | 4/2009 |
| JP | 2016-136299 A | 7/2016 |
| JP | 2017-003611 A | 1/2017 |

OTHER PUBLICATIONS

Linghan Zhang et al., Hearing Your Voice is Not Enough: An Articulatory Gesture Based Liveness Detection for Voice Authentication, Oct. 30, 2017, ACM, pp. 57-71. (Year: 2017).*
Fidalizia Pyrtuh et al., Comparative Evaluation of Feature Normalization Techniques for Voice Password based Speaker Verification, Mar. 20, 2014, IEEE, pp. 1-4. (Year: 2014).*
Martha Birnbaum et al., A Voice Password System for Access Security, Sep.-Oct. 1986, ACM, vol. 65, Issue: 5, pp. 68-74. (Year: 1986).*
The Extended European Search Report Issue in corresponding EP Application No. 18932980.8, dated Mar. 23, 2022.
International Search Report issued in corresponding International Patent Application No. PCT/JP2018/033885, dated Dec. 11, 2018, with English translation.

* cited by examiner

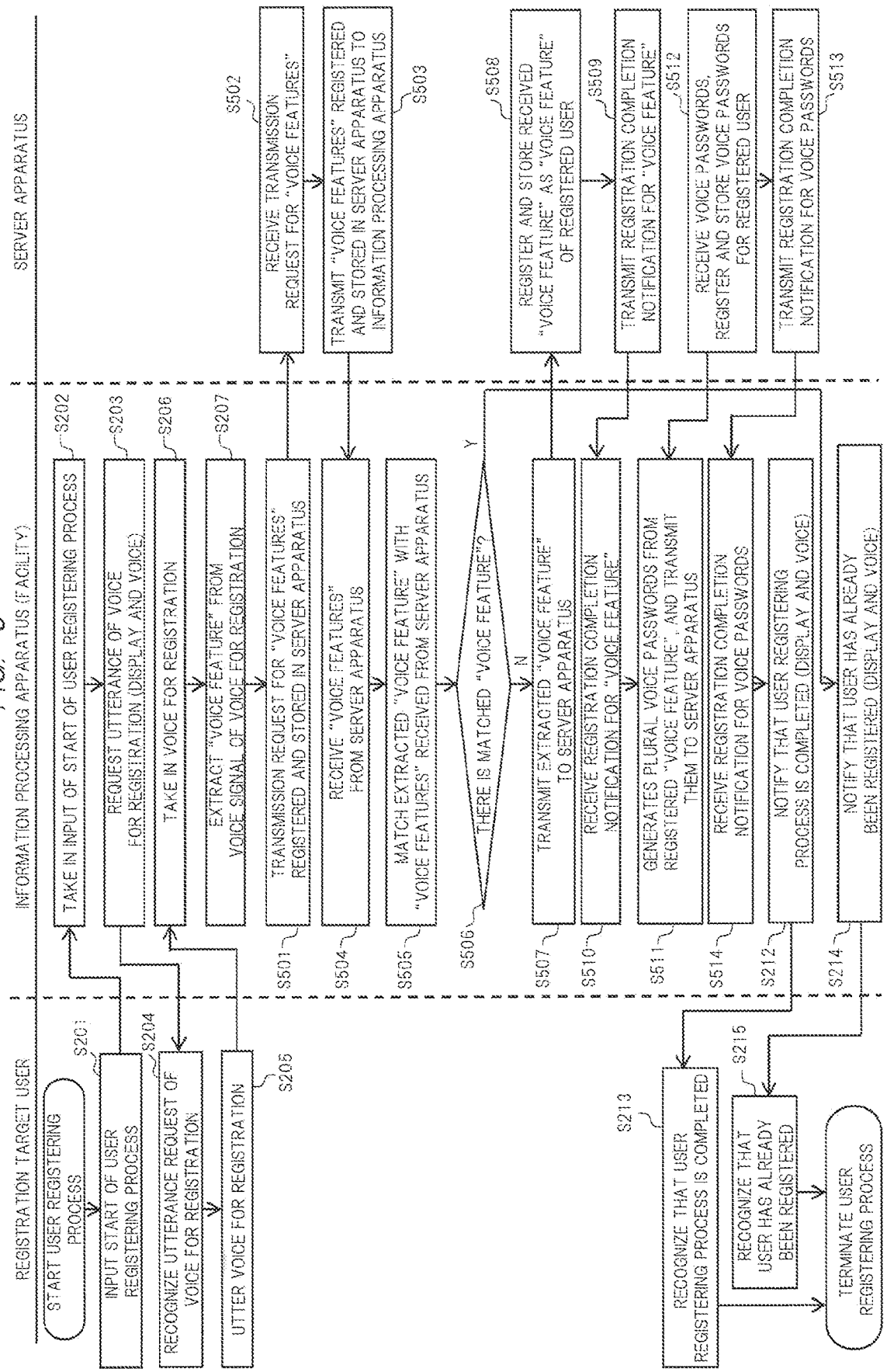

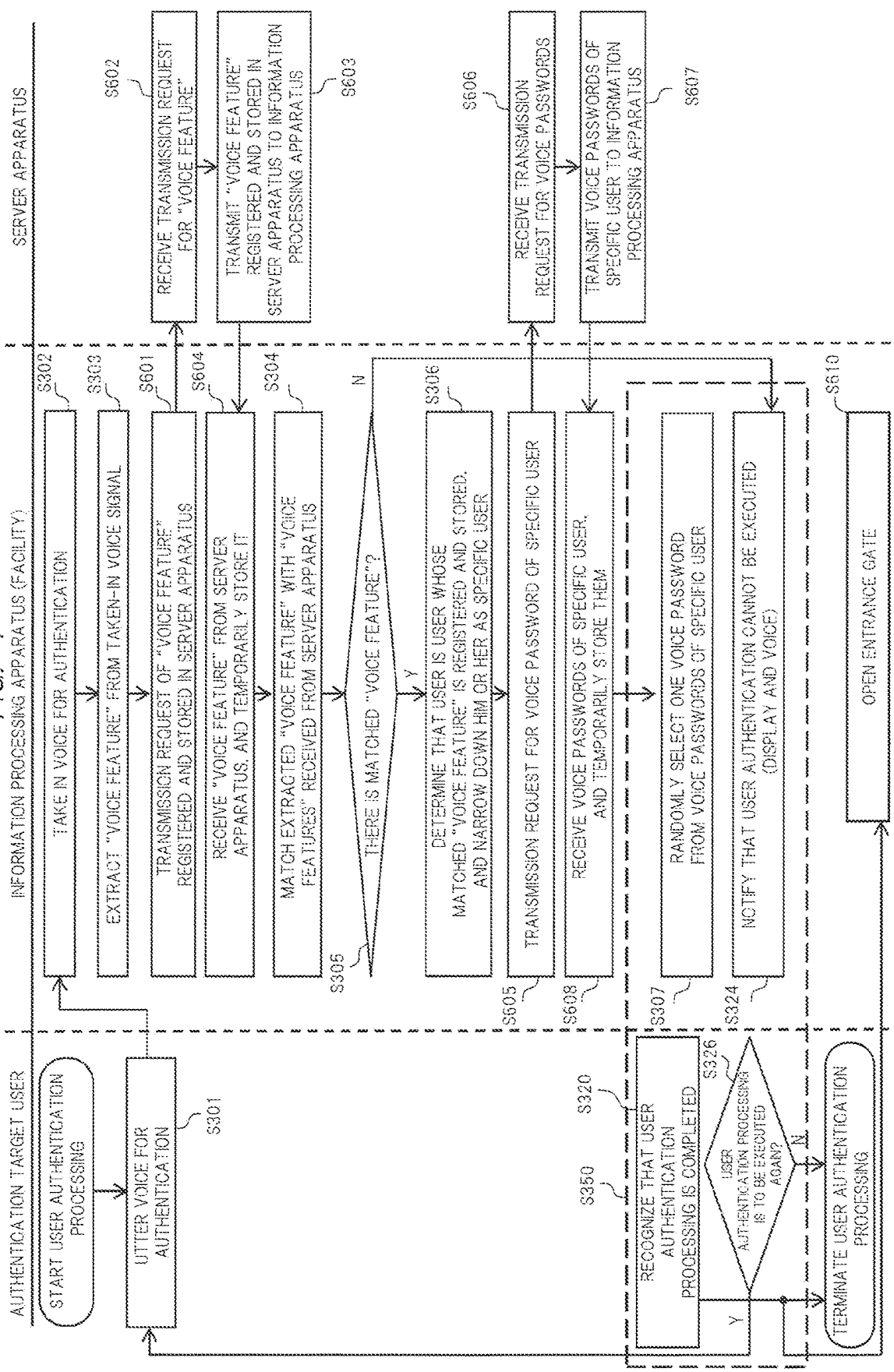

INFORMATION PROCESSING APPARATUS, USER AUTHENTICATION NETWORK SYSTEM, AND USER AUTHENTICATION METHOD

CROSS REFERENCE

This application is the U.S. National Phase under 35 U.S.C. § 371 of International Application No. PCT/JP2018/033885, filed on Sep. 12, 2018, the entire contents are hereby incorporated by reference.

TECHNICAL FIELD

The present invention relates to an information processing apparatus, a user authentication network system, and a user authentication method.

BACKGROUND ART

In an information processing apparatus or a network system, user authentication by a voice input is executed. In the user authentication by the voice input, password voice is registered in advance. Then, in a case where the registered password voice is matched with password voice inputted by a person who intends to be authenticated, this person is authenticated as a registrant himself or herself.

For example, Patent document 1 discloses a person authentication method in which password voice and a word that becomes a key for the password voice are registered in combination with each other, and the word that becomes the key is presented to a user at the time of authentication to request the user to utter the password voice corresponding to the word that becomes the key. This makes it difficult for other persons to be authenticated falsely.

RELATED ART DOCUMENTS

Patent Documents

Patent document 1: Japanese Patent Application Publication No. H10-173644

SUMMARY OF THE INVENTION

Problems to be Solved by the Invention

However, in the method disclosed in Patent document 1, the user is required to memorize the registered password voice accurately and utter the password voice at the time of authentication. This becomes a heavy load on the user. Moreover, if the user forgets the password voice, the user cannot be authenticated, whereby the user cannot use an information processing apparatus or the like.

It is thus an object of the present invention to provide an information processing apparatus, a user authentication network system, and a user authentication method capable of executing user authentication using a voice input, which has good usability and high safety.

Means for Solving the Problem

An outline of representative invention of the present invention disclosed in the present application will briefly be explained as follows.

According to a representative embodiment of the present invention, there is provided an information processing apparatus that includes: a voice input processing unit; a memory; and a controller. In this case, in a user registering process for registering a user with the information processing apparatus, the voice input processing unit is configured to take in voice for registration uttered by a registration target user to convert the voice for registration into a first voice signal. The controller is configured to extract a first voice feature from the first voice signal to compare the first voice feature with each of voice features of already-registered users that have already been stored in the memory. In a case where the first voice feature is not matched with any of the voice features of the already-registered users, the controller is configured to execute a process for storing the first voice feature in the memory so as to be associated with the registration target user, a process for generating a voice password based on the first voice feature, and a process for storing the voice password in the memory. The controller is configured to execute user authentication processing for an authentication target user by using the voice password stored in the memory by the user registering process.

Effects of the Invention

Effects obtained by the representative invention of the present invention disclosed in the present application will briefly be explained as follows.

Namely, according to the representative embodiment of the present invention, it becomes possible to execute user authentication using a voice input, which has good usability and high safety.

BRIEF DESCRIPTIONS OF THE DRAWINGS

FIG. 6 is a view illustrating one example of an operation sequence of a user registering process according to the second embodiment of the present invention; and FIG. 7 is a view illustrating one example of an operation sequence of user authentication processing according to the second embodiment of the present invention.

DETAILED DESCRIPTION OF EMBODIMENTS

Figure 1:
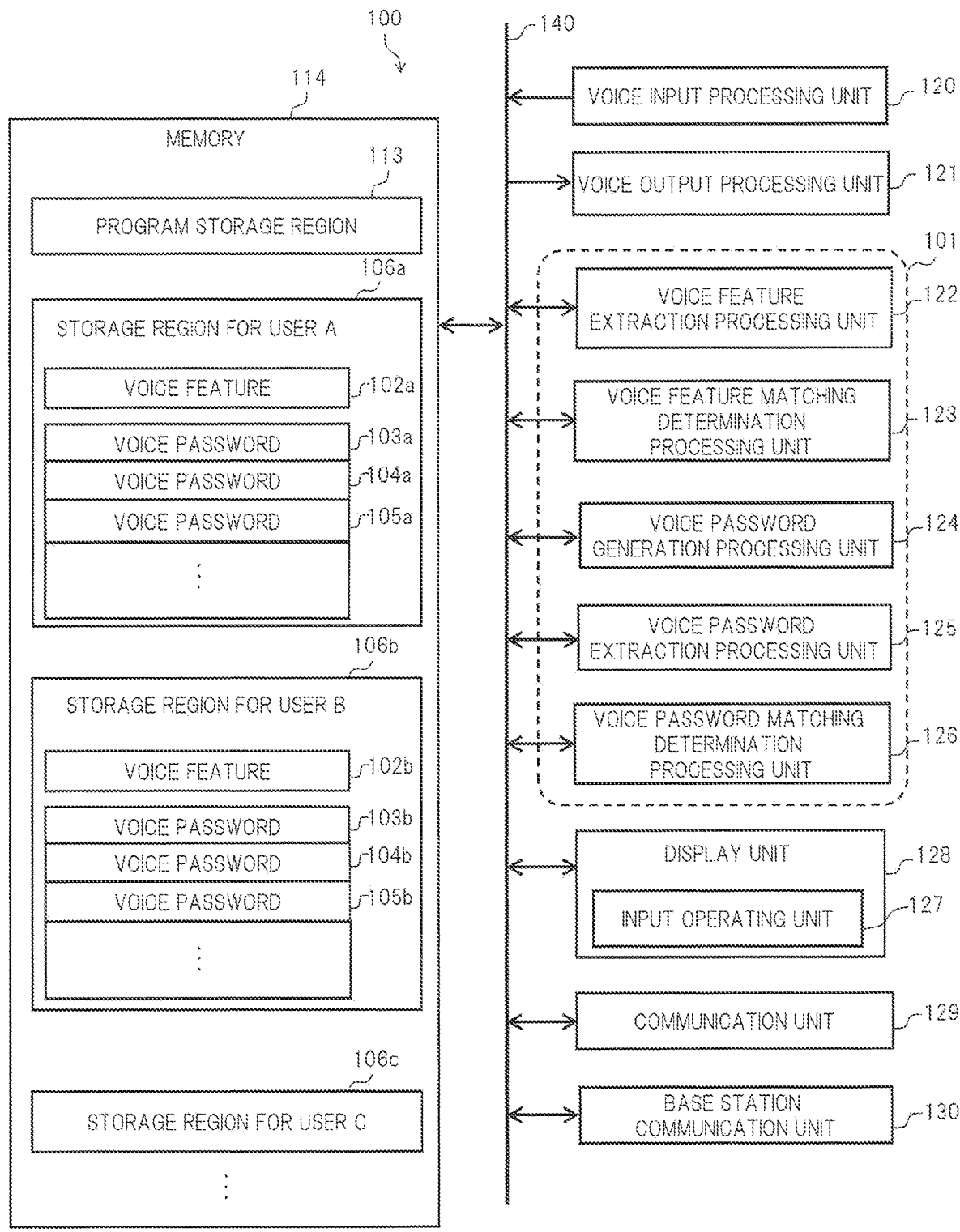
FIG. 1 is a block diagram illustrating one example of a configuration of an information processing apparatus according to a first embodiment of the present invention.

Hereinafter, embodiments of the present invention will be described in detail with reference to the drawings. Note that in all of the drawings for explaining the embodiments, the same reference numeral is generally assigned to a member having the same function, and its repeated explanation will be omitted.

First Embodiment

FIG. 1 is a block diagram illustrating one example of a configuration of an information processing apparatus according to a first embodiment of the present invention. As illustrated in FIG. 1, an information processing apparatus 100 includes a controller 101, a memory 114, a voice input processing unit 120, a voice output processing unit 121, a display unit 128, a communication unit 129, and a base station communication unit 130. These components constituting the information processing apparatus 100 are connected to each other via a bus 140.

The memory 114 is a functional block for storing various kinds of information handled by the information processing apparatus 100. The memory 114 has a nonvolatile memory such as a flash memory, for example, and stores therein various kinds of programs executed by the controller 101, and various kinds of information such as voice features or voice passwords of the respective already-registered users. The memory 114 includes a program storage region 113 and user information storage regions 106 (for example, 106a to 106c).

The program storage region 113 is a storage region for storing various kinds of programs such as an OS (Operating System) or an application for an operation control. These programs are executed by the controller 101.

The user information storage region 106a is a storage region for storing user information of a user A who is an already-registered user, for example. The user information storage region 106a includes a voice feature storage region 102a for storing a voice feature of the user A, voice password storage regions (for example, 103a to 105a) each for storing a voice password of the user A, and the like. The voice password storage regions 103a to 105a respectively store voice passwords for user authentication of the user A, which are different from each other. Note that the number of voice password storage regions may be less than or more than this.

The user information storage region 106b is a storage region for storing user information of a user B who is an already-registered user, for example. The user information storage region 106b includes a voice feature storage region 102b for storing a voice feature of the user B, voice password storage regions (for example, 103b to 105b) each for storing a voice password of the user B, and the like. The voice password storage regions 103b to 105b respectively store voice passwords for user authentication of the user B, which are different from each other. Note that in the user information storage region 106b, the number of voice password storage regions may also be less than or more than this.

The user information storage region 106c is a storage region for storing user information of a user C who is an already-registered user, for example. The user information storage region 106c includes a voice feature storage region 102c for storing a voice feature of the user C (not illustrated in the drawings), voice password storage regions (for example, 103c to 105c, which are not illustrated in the drawings) each for storing a voice password of the user C, and the like. The voice password storage regions 103c to 105c respectively store voice passwords for user authentication of the user C, which are different from each other. Note that in the user information storage region 106c, the number of voice password storage regions may also be less than or more than this.

The voice input processing unit 120 includes a microphone for a voice input, and the like. The voice input processing unit 120 is configured to take in external voice via the microphone to convert the take-in voice into a voice signal. The voice input processing unit 120 outputs the voice signal to the memory 114 or the controller 101. The memory 114 may store therein the voice signal outputted from the voice input processing unit 120.

The voice output processing unit 121 includes a speaker for voice output and the like. The voice output processing unit 121 emits voice based on the voice signal to the outside via the speaker.

The controller 101 is a functional block for controlling the respective units that constitute the information processing apparatus 100. The controller 101 includes a CPU (Central Processing Unit), a RAM (Random Access Memory), and the like. The controller 101 reads out the various kinds of programs such as the OS or the application for operation control from the program storage region 113 of the memory 114, and develops them on the RAM. Then, the controller 101 executes the program developed on the RAM by means of the CPU, thereby realizing, via the CPU, each functional block such as a voice feature extraction processing unit 122, a voice feature matching determination processing unit 123, a voice password generation processing unit 124, a voice password extraction processing unit 125, or a voice password matching determination processing unit 126 illustrated in FIG. 1. Then, the controller 101 controls an operation of the information processing apparatus 100 by these functional blocks. Note that each functional block in the controller 101 may be realized by only software, or may be realized by software and hardware.

The voice feature extraction processing unit 122 extracts a voice feature of a person who utters voice from the voice signal outputted from the voice input processing unit 120. Note that as a process to extract the voice feature, well-known art generally used in a so-called voice recognizing process may be utilized. Specifically, by executing frequency analysis for a voice signal every interval of several tens ms, frequency information on voice (acoustic spectrum) is obtained in time series, and this acoustic spectrum is extracted as a voice feature.

The voice feature matching determination processing unit 123 compares and matches the voice feature extracted by the voice feature extraction processing unit 122 with each of voice features of already-registered users stored in the voice feature storage regions (for example, 102a to 102c) of the memory 114, and determines whether the both are matched with each other or not.

The voice password generation processing unit 124 generates a plurality of voice passwords on the basis of the voice feature stored in the voice feature storage region. For example, the voice password generation processing unit 124 generates a plurality of voice passwords of the user A on the basis of the voice feature stored in the voice feature storage region 102a. Similarly, for example, the voice password generation processing unit 124 generates a plurality of voice passwords of each of the users B and C on the basis of the voice features stored in the voice feature storage regions 102b and 102c.

Further, during usage of the information processing apparatus 100, a voice feature of each registered user is updated at any time. Therefore, the voice password generation processing unit 124 may generate new voice passwords on the basis of the updated voice feature. The voice password generation processing unit 124 stores the generated voice passwords in voice password storage regions of the corresponding already-registered user.

At the time of user authentication processing, the voice password extraction processing unit 125 extracts voice passwords from voice uttered by an authentication target user.

The voice password matching determination processing unit 126 compares and matches the voice password extracted by the voice password extraction processing unit 125 with each of the voice passwords stored in the user information storage regions of the memory 114, and determines whether the both are matched with each other or not.

The display unit 128 includes a display panel such as a liquid crystal panel, for example, and displays various kinds of information to be notified to a user. For example, the display unit 128 displays information such as wording of a voice password that an authentication target user shall utter at the time of the user authentication processing. An input operating unit 127 is provided in the display unit 128. The input operating unit 127 is an input device such as a keyboard or a mouse, for example, and various kinds of information are inputted thereinto by means of an operation of a user.

Note that the display panel may be configured by a capacitive touch panel, and the display panel may be used as the input operating unit 127. In this case, the user inputs various kinds of information by an approaching operation or a touch operation toward the touch panel by means of a finger, a touch pen, or the like.

For example, the communication unit 129 is a communication interface that is connected to an external network via a wireless LAN or a wired LAN, and is configured to transmit and receive information with each of apparatuses connected to the external network.

For example, the base station communication unit 130 is a communication interface configured to execute long-range wireless communication such as W-CDMA (Wideband Code Division Multiple Access) or GSM (registered trademark) (Global System for Mobile communications). The base station communication unit 130 executes transmission and reception of information with a device connected to the long-range wireless communication via a transmission/reception antenna.

Note that in a case where connection with an external database is required at the time of a voice feature extracting process, the information processing apparatus 100 accesses the external database via the communication unit 129 or the base station communication unit 130, transmits and receives various kinds of information with the external database.

<User Registering Process>

Figure 2:
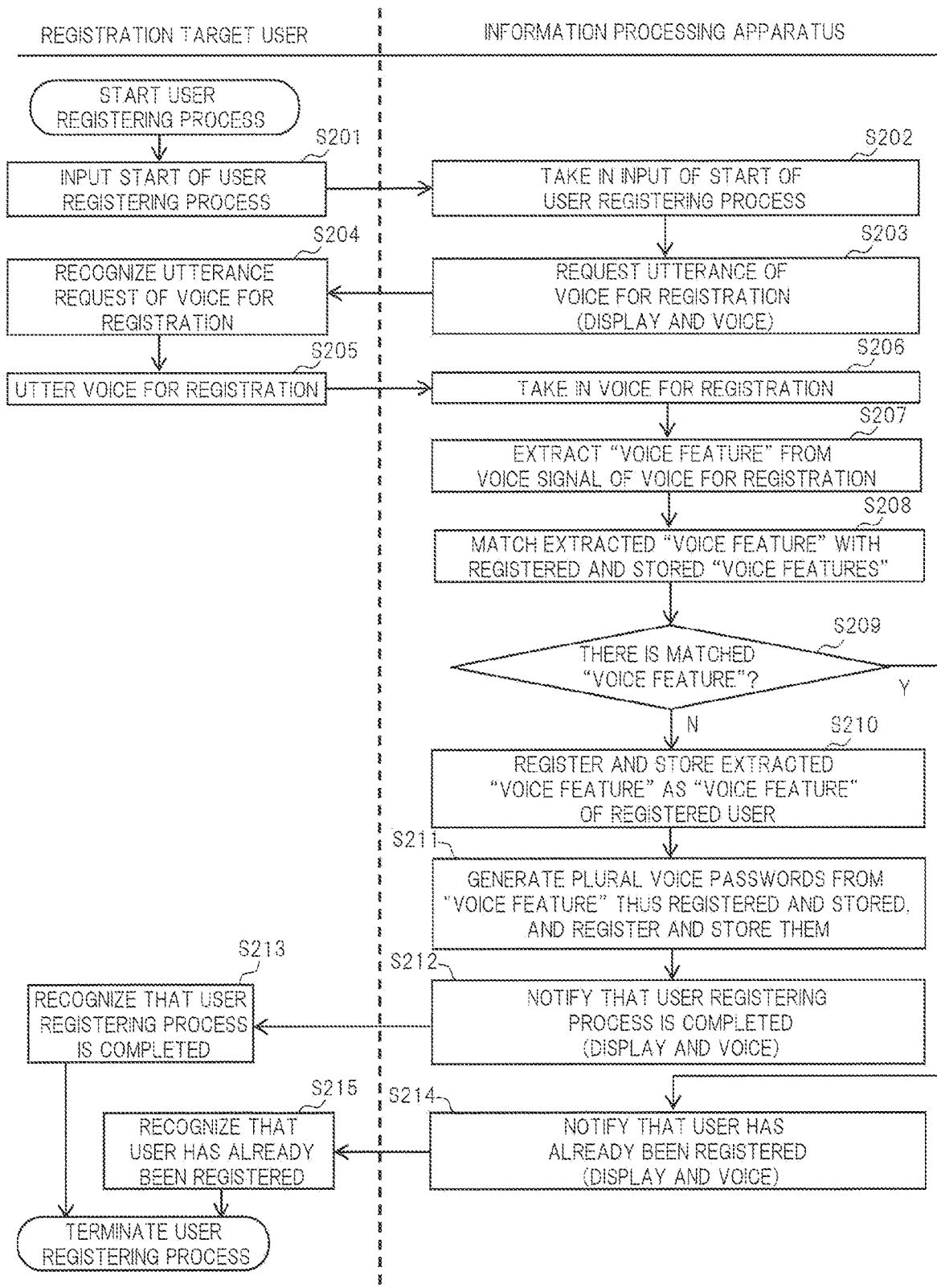
FIG. 2 is a view illustrating one example of an operation sequence of a user registering process according to the first embodiment of the present invention.

Next, a user registering process according to the present embodiment will be described. FIG. 2 is a view illustrating one example of an operation sequence of the user registering process according to the first embodiment of the present invention. In FIG. 2, a left side thereof illustrates an operation of a registration target user, and a right side thereof illustrates an operation of the information processing apparatus 100. The user registering process is a process for registering a user with the information processing apparatus 100. In the user registering process, processes at Steps S201 to S215 below are executed.

First, at Step S201, the registration target user carries out an input operation for starting the user registering process via the input operating unit 127. For example, the registration target user carries out an operation of a registration start button, a touch of a registration start button displayed on the display panel, or an input operation of a temporary password.

The information processing receives a apparatus 100 registration start input from the input operating unit 127 (S202), and requests the registration target user to utter any voice for registration (S203). Specifically, the information processing apparatus 100 requests the registration target user to do so by displaying a request for voice utterance on the display unit 128 or communicating the request by voice from the voice output processing unit 121 via a speaker.

When the registration target user recognizes the request for the voice utterance by the information processing apparatus 100 (S204), the registration target user utters any voice for registration toward the information processing apparatus 100 (S205).

When the voice for registration is uttered from the registration target user, the voice input processing unit 120 takes in the voice for registration to convert the voice into a voice signal (a first voice signal), and outputs the voice signal to the controller 101 via the bus 140 (S206).

The voice feature extraction processing unit 122 extracts a voice feature (a first voice feature) of the registration target user from the voice signal outputted from the voice input processing unit 120 (S207). Then, the voice feature matching determination processing unit 123 compares and matches the voice feature of the registration target user with each of features of already-registered users (S208), which have already been stored in the voice feature storage regions (for example, 102a to 102c) of the memory 114, and determines whether the voice feature of the registration target user has already been stored in any of the voice feature storage regions (for example, 102a to 102c) or not (S209).

In a case where it is determined that the voice feature of the registration target user is not matched with any of the voice features of the already-registered users stored in the voice feature storage regions (for example, 102a to 102c) (N), the controller 101 determines that the registration target user is a newly registered user who has not been registered yet, and stores the voice feature of the registration target user in the memory 114 so as to be associated with the registration target user (S210). Specifically, the controller 101 newly assigns a user information storage region 106 for this registration target user, and stores the voice feature of the registration target user in a voice feature storage region 102 of the user information storage region 106 thus newly assigned (S210).

Then, the voice password generation processing unit 124 generates a plurality of voice passwords for the registration target user on the basis of the voice feature of the registration target user, and respectively stores the plurality of voice passwords thus generated in voice password storage regions (for example, 103 to 105) of the user information storage region 106 thus newly assigned (S211).

The controller 101 notifies the registration target user that the user registering process is completed by displaying it on the display unit 128, or emitting it from the voice output processing unit 121 (Step S212). Note that the controller 101 may notify the registration target user that the user registering process is completed by using both display on the display unit 128 and sound emission from the voice output processing unit 121.

The registration target user recognizes that the user registering process for himself or herself is completed by notification from the information processing apparatus 100 (S213). As a result, a series of processes for the user registering process is completed.

On the other hand, in a case where it is determined at Step S209 that the voice feature of the registration target user is matched with the voice feature stored in any voice feature storage region (for example, 102a to 102c) (Y), the controller 101 determines that this registration target user is an already-registered user who has already been registered, and notifies the registration target user that the registration target user has already been registered by displaying it on the display unit 128, or emitting it from the voice output processing unit 121 (Step S214). Note that in this case, the controller 101 also uses both the display on the display unit 128 and the sound emission of the voice output processing unit 121.

Then, the user recognizes that the user oneself has already been registered as an already-registered user by notification from the information processing apparatus 100 (S213). As a result, the series of processes for the user registering process is also terminated.

The information processing apparatus 100 executes these user registering processes each time there is a request from a registration target user.

<User Authentication Processing>

Figure 3:
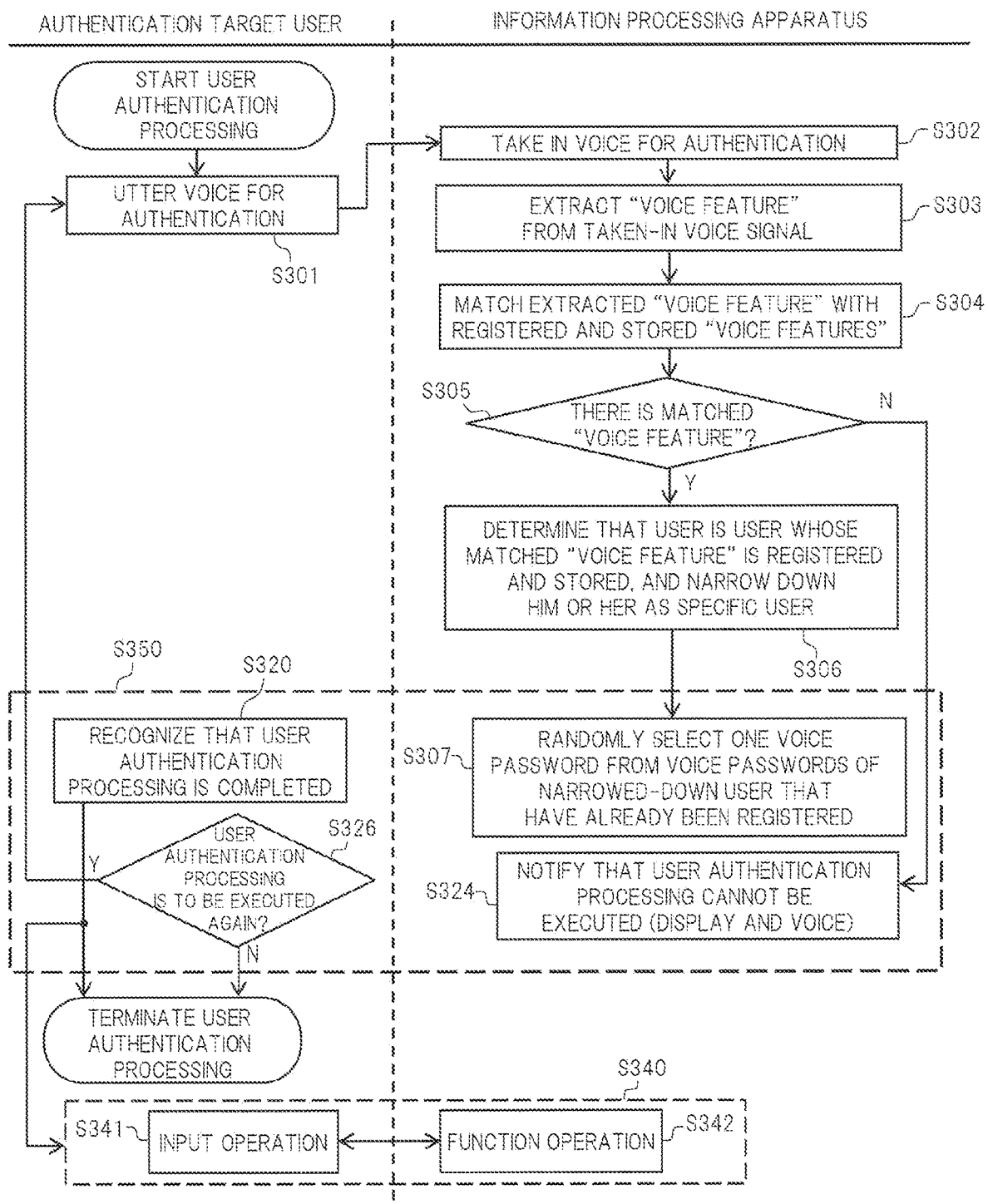
FIG. 3 is a view illustrating one example of an operation sequence of user authentication processing according to the first embodiment of the present invention.
Figure 4:
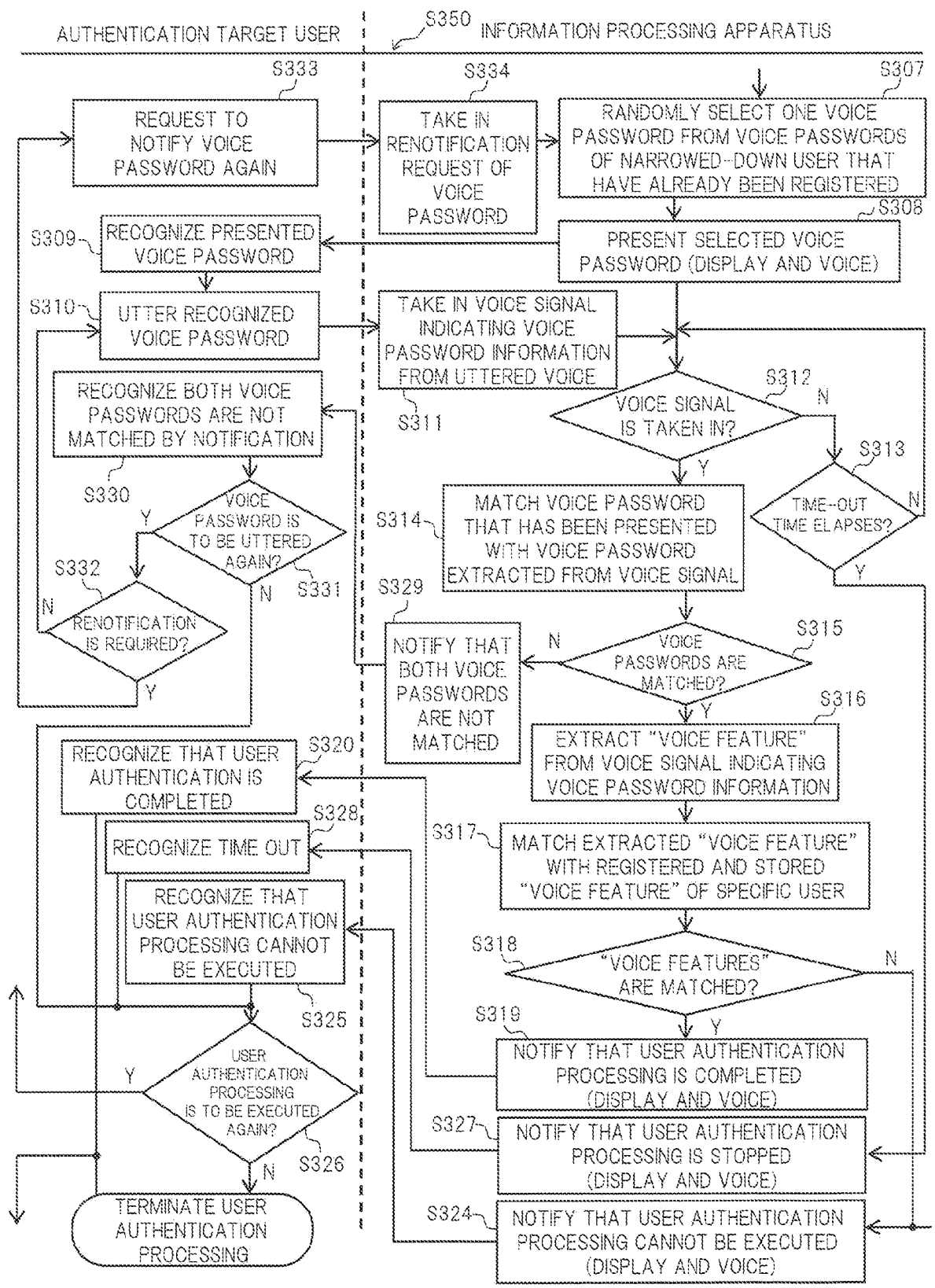
FIG. 4 is a view illustrating one example of the operation sequence of the user authentication processing according to the first embodiment of the present invention.

Next, user authentication processing according to the present embodiment will be described. FIG. 3 and FIG. 4 are views illustrating one example of an operation sequence of the user authentication processing according to the first embodiment of the present invention. In FIG. 3 and FIG. 4, a left side thereof illustrates an operation of an authentication target user, and a right side thereof illustrates an operation of the information processing apparatus 100. Note that FIG. 4 illustrates the detailed processing content of a main sequence S350 illustrated in FIG. 3. In the main sequence S350 of FIG. 3, only Steps indicating a connection relationship between the main sequence and the outside of the main sequence are illustrated for convenience.

First, at Step S301, the authentication target user utters any voice for authentication toward the information processing apparatus 100 in order to start the user authentication processing.

The voice input processing unit 120 takes in the voice for authentication uttered by the authentication target user to convert the voice for authentication into a voice signal (a second voice signal), and outputs the voice signal to the controller 101 via the bus 140 (S302).

The voice feature extraction processing unit 122 extracts a voice feature (a second voice feature) of the authentication target user from the voice signal outputted from the voice input processing unit 120 (S303). Then, the voice feature matching determination processing unit 123 compares and matches the voice feature of the authentication target user with each of the voice features of the already-registered users (S304), which have already been stored in the voice feature storage regions (for example, 102a to 102c) of the memory 114, and determines whether the voice feature of the authentication target user has already been stored in any of the voice feature storage regions (for example, 102a to 102c) or not (S305).

In a case where it is determined that the voice feature of the authentication target user is not matched with any of the voice features of the already-registered users stored in the voice feature storage regions (102a to 102c, . . . ) (N), the controller 101 determines that the authentication target user has not been registered yet and is not an already-registered user, and notifies the authentication target user that the user authentication processing cannot be executed by displaying it on the display unit 128 or emitting it from the voice output processing unit 121 (S324).

When the authentication target user recognizes that the user authentication processing cannot be executed by notification from the information processing apparatus 100 (S325), the authentication target user determines whether the user authentication processing is to be executed again or not (S326). Then, in a case where the authentication target user determines that the user authentication processing is to be executed again (Y), the authentication target user utters follow-up voice for authentication at Step S301 again.

Further, in a case where the authentication target user determines that the user authentication processing is not to be executed again (N), the user authentication processing is terminated.

On the other hand, in a case where it is determined at Step S305 that the voice feature matching determination processing unit 123 matches the voice feature of the authentication target user with a voice feature stored in any voice feature storage region (for example, 102a) (Y), the controller 101 narrows down the already-registered user (for example, the user A) corresponding to the voice feature that is matched with the voice feature of the authentication target user as a specific user who will become an authentication target by voice passwords (S306).

When the specific user (for example, the user A) is narrowed down, the controller 101 randomly selects one voice password from a plurality of voice passwords stored in the voice password storage regions (for example, 103a to 105a) of the user information storage region (for example, 106a) that corresponds to the specific user (S307). Then, the controller 101 presents the selected voice password to the authentication target user by displaying it on the display unit 128 or emitting it from the voice output processing unit 121, and urges the authentication target user to utter the presented voice password (S308).

When the authentication target user recognizes the voice password notified from the information processing apparatus 100 (S309), the authentication target user utters the recognized voice password (S310).

After the voice password is presented to the authentication target user, the voice input processing unit 120 takes in voice of the voice password uttered by the authentication target user to convert the voice of the voice password into a voice signal (a third voice signal), and outputs the voice signal to the controller 101 via the bus 140. Then, the voice password extraction processing unit 125 extracts the voice password uttered by the authentication target user from the taken-in voice signal (S311).

In parallel with these processes, the controller 101 determines whether the voice of the voice password, which was uttered by the authentication target user, is taken in or not after the authentication target user is notified of the voice password (S312). Moreover, the controller 101 measures a presentation time that is elapsed since the authentication target user was notified of the voice password, and determines whether a time-out time set in advance elapses as the presentation time or not (S313).

For example, in a case where it is determined at Step S312 that the voice of the voice password uttered by the authentication target user is not taken in (N) and it is determined at Step S313 that the time-out time does not elapse as the presentation time (N), the controller 101 executes the process at Step S312 again. Namely, in this case, the information processing apparatus 100 continues to wait until the voice of the voice password uttered by the authentication target user is taken in.

Further, for example, in a case where it is determined at Step S312 that the voice of the voice password uttered by the authentication target user is not taken in (N) and it is determined at Step S313 that the time-out time elapses as the presentation time (Y), the controller 101 stops the user authentication processing due to expiration of time (time out). Then, the controller 101 notifies the authentication target user that the user authentication processing is stopped due to the time out by displaying it on the display unit 128, or emitting it from the voice output processing unit 121 (S327).

The authentication target user recognizes that the user authentication processing is stopped due to the time out (S328), and determines whether the user authentication processing is to be executed again or not (S326). Since Step S326 has already been described, explanation for the subsequent processes will be omitted herein.

On the other hand, in a case where the controller 101 determines at Step S312 that the voice uttered by the authentication target user is taken in (Y), that is, in a case where it is determined that the voice password is taken in within the time-out time, the voice password matching determination processing unit 126 compares and matches the voice password presented to the authentication target user with the voice password extracted from the voice signal (the third voice signal) of the authentication target user (S314), and determines whether these voice passwords are matched with each other or not (S315).

In a case where the voice password matching determination processing unit 126 determines at Step S315 that these voice passwords are not matched with each other (N), the controller 101 notifies the authentication target user that these voice passwords are not matched with each other by displaying it on the display unit 128, or emitting it from the voice output processing unit 121 (S329).

The authentication target user recognizes that these voice passwords are not matched with each other by notification from the information processing apparatus 100. Namely, the authentication target user recognizes that the presented voice password is not matched with the voice password uttered by himself or herself (S330), and determines whether the voice password is to be uttered again or not (S331).

In a case where the authentication target user determines at Step S331 that utterance of the voice password again is not to be carried out (N), the process at Step S326 is executed. Since Step S326 has already been described, its explanation will be omitted.

On the other hand, in a case where the authentication target user determines at Step S331 that the utterance of the voice password again is to be carried out (Y), the authentication target user determines whether to request the information processing apparatus 100 to notify the voice password again or not (S332). In a case where the authentication target user determines at Step S332 not to request the information processing apparatus 100 to notify the voice password again (N), the processing flow returns to Step S310, and the authentication target user utters the same voice password as one previously notified again.

On the other hand, in a case where the authentication target user determines at Step S332 to request notification of the voice password again (Y), the authentication target user requests the information processing apparatus 100 to notify the voice password again by means of utterance or an input operation (S333).

Then, the information processing apparatus 100 takes in the renotification request from the authentication target user (S334), and notifies the authentication target user of another voice password of the specific user by executing the processes at Steps S307 to S308 again.

Here, in a case where the voice password matching determination processing unit 126 determines at Step S315 that the voice password of the specific user presented to the authentication target user is matched with the voice password extracted from the voice signal (the third voice signal) of the authentication target user (Y), the voice feature extraction processing unit 122 extracts a voice feature (a third voice feature) from the voice signal of the voice of the voice password uttered by the authentication target user and taken in at Step S311 (S316). Then, the voice feature matching determination processing unit 123 compares and matches the extracted voice feature with the voice feature of the specific user (for example, the user A) (S317), and determines whether the voice features of the both are matched with each other or not (S318).

In a case where the voice feature matching determination processing unit 123 determines that these voice features are not matched with each other (N), the controller 101 notifies the authentication target user that user authentication is impossible (S324).

On the other hand, in a case where the voice feature matching determination processing unit 123 determines that these voice features are matched with each other (Y), the controller 101 determines that the authentication target user is a specific user (for example, the user A), and completes the user authentication processing. Then, the controller 101 notifies the authentication target user that the user authentication processing is completed by displaying it on the display unit 128, or emitting it from the voice output processing unit 121 (S319). The authentication target user himself or herself is authenticated as an already-registered user by notification from the information processing apparatus 100, and recognizes that the user authentication processing is completed (S320). As a result, the user authentication processing is terminated.

<After Completion of User Authentication Processing>

The already-registered user thus authenticated (the specific user, for example, the user A) is allowed to utilize various kinds of functions of the information processing apparatus 100 (S340). Specifically, the already-registered user thus authenticated carries out an input operation to the information processing apparatus 100 (S341), whereby the already-registered user thus authenticated can operate a wireless communication function, a telephone function, or the like of the information processing apparatus 100 (S342).

Further, when the already-registered user thus authenticated carries out an input operation such as a tap operation onto an icon at Step S341, for example, the information processing apparatus 100 executes a corresponding application at Step S342 to realize various kinds of functions.

Further, the voice input processing unit 120 takes in voice uttered by the already-registered user thus authenticated via a call, a voice operation, or the like (voice after authentication) to convert the voice into a voice signal (a fourth voice signal). Then, the controller 101 extracts a voice feature (fourth voice feature) of the already-registered user thus authenticated from this voice signal, and updates the voice feature of this already-registered user stored in the memory 114 on the basis of the extracted voice feature.

Then, the voice password generation processing unit 124 generates a new voice password on the basis of the updated voice feature, and stores it in the memory 114. Thus, the information processing apparatus 100 continues to update the voice feature for each already-registered user, whereby it becomes possible to generate more complicated voice passwords.

Further, the information processing apparatus 100 may instruct the already-registered user who is using the information processing apparatus 100 to utter more phrases by displaying it on the screen or emitting voice. For example, the information processing apparatus 100 instructs an already-registered user who infrequently talks with another already-registered user or uses the information processing apparatus 100, or an already-registered user who infrequently carries out an input operation by voice to utter voice. As a result, the information processing apparatus 100 can collect a large number of voices of the already-registered users, update the voice features at any time, and generate more complicated voice passwords. This makes it possible to improve the safety of the information processing apparatus 100.

<Usage Range of Information Processing Apparatus>

The information processing apparatus 100 according to the present embodiment is mounted on a head mounted display (HMD), for example. The information processing apparatus 100 executes a user registering process and user authentication processing for a user of the HDM. Further, the information processing apparatus 100 may be a cellular phone, a smartphone, a tablet terminal, an AI speaker, or the like, for example.

<Effects and the Like>

According to the present embodiment, the controller 101 generates the voice password of the registration target user on the basis of the registered and stored voice feature in the user registering process, and causes the authentication target user to utter the voice password in the user authentication processing.

According to this configuration, already-registered user is not required to carry out associate or memorize the voice password. Therefore, it becomes possible to execute the user authentication using the voice inputs, which has good usability and high safety.

Further, according to the present embodiment, the controller 101 generates the plurality of voice passwords for each already-registered user, and presents any voice password randomly selected from the plurality of voice passwords to the authentication target user.

According to this configuration, since voice passwords generated automatically, it is no need for the already-registered user to register the passwords. This makes it possible to further improve usability thereof. Further, according to this configuration, it is possible to set a voice password to be presented to the authentication target user as an ad-hoc one-time voice password. Therefore, it becomes possible to prevent unrightful authentication of a third person by furtive glance or eavesdropping.

Further, according to the present embodiment, in a case where it is determined that the time-out time elapses as the presentation time that is elapsed since the voice password is presented to the authentication target user, the controller 101 stops the user authentication processing.

A considerable time is required for a third person to obtain a one-time voice password by furtive glance or eavesdropping. Therefore, according to this configuration, it becomes possible to further prevent unrightful authentication of a third person by using a one-time voice password.

Note that in the present embodiment, in a case where it is determined that the voice password presented to the authentication target user is matched with the voice password uttered by the authentication target user, the controller 101 executes a process to extract a voice feature (the third voice feature) from the voice password uttered by the authentication target user, and a process to determine whether this voice feature is matched with a voice feature of a specific user or not. However, the present invention is not limited to such a sequence. In a case where it is determined that the voice password presented to the authentication target user is matched with the voice password uttered by the authentication target user, the controller 101 may determine that the authentication target user is the specific user, and terminate the user authentication processing.

According to this configuration, a time required for the user authentication can be shortened. This makes it possible to improve the usability thereof while ensuring the safety of the user authentication processing.

Further, in the present embodiment, the voice feature is extracted twice at the time when the voice for authentication is taken in (S303) and the time when the voice password is taken in (S311), and it is compared and matched with the registered and stored voice feature (S314 to S315). At that time, at Step S303, a threshold value for matching and determination of a feature amount of the voice feature may be set to be wider to the extent that an already-registered user with the closest feature amount is narrowed down as a specific user. At Step S311, the threshold value for matching and determination of the feature amount of the voice feature may be set to be narrower, and it may be determined that the authentication target user is the specific user only in a case where a degree of coincidence of the voice features is high.

Further, in the present embodiment, the voice password generation processing unit 124 may appropriately change complexity of the voice password depending upon a word, a length of a sentence, the number of voice passwords, or the like. According to this configuration, it is possible to take into consideration a required security level and a usage status, and this makes it possible to ensure a good balance between safety and convenience.

Further, in the present embodiment, the voice password may be changed at regular intervals, or a voice password that has been used once may not be used again. This makes it possible to further prevent unrightful authentication by a third person, and it is thus possible to further improve the safety.

The voice feature of the registered user may vary in accordance with a time zone. For this reason, the information processing apparatus 100 may register and store the voice feature for each time zone of each registered user. Then, the controller 101 may execute the user authentication processing on the basis of the voice password using the voice feature according to each time zone. According to this configuration, since the user authentication processing using more appropriate voice feature is executed, it becomes possible to improve accuracy of the user authentication.

Further, in the field (or open air), voice of a voice password by an authentication target user at the time of the user authentication processing may be eavesdropped by a third person. Therefore, the voice password used in the field may be configured to be used only indoors.

Further, the case where the voice password is automatically generated by the voice password generation processing unit 124 has been described in the present embodiment. However, voice uttered by the registered user may be registered as the voice password.

Further, the case where the randomly selected voice password is presented to the user has been described in the present embodiment. However, a plurality of voice passwords may be presented to the authentication target user, and the authentication target user may select any voice password to be uttered from the plurality of voice passwords.

Further, it has been configured so that the authentication target user utters any kind of voice for authentication at the time of start of the user authentication processing. However, the voice registered in advance by the already-registered user may be caused the considerable authentication target to utter as the voice for authentication.

Second Embodiment

Next, a second embodiment will be described. In the present embodiment, a user authentication network system that executes user authentication with a server apparatus via a network will be described. Note that hereinafter, explanation of units that overlap with the embodiment described above will be omitted appropriately.

Figure 5:
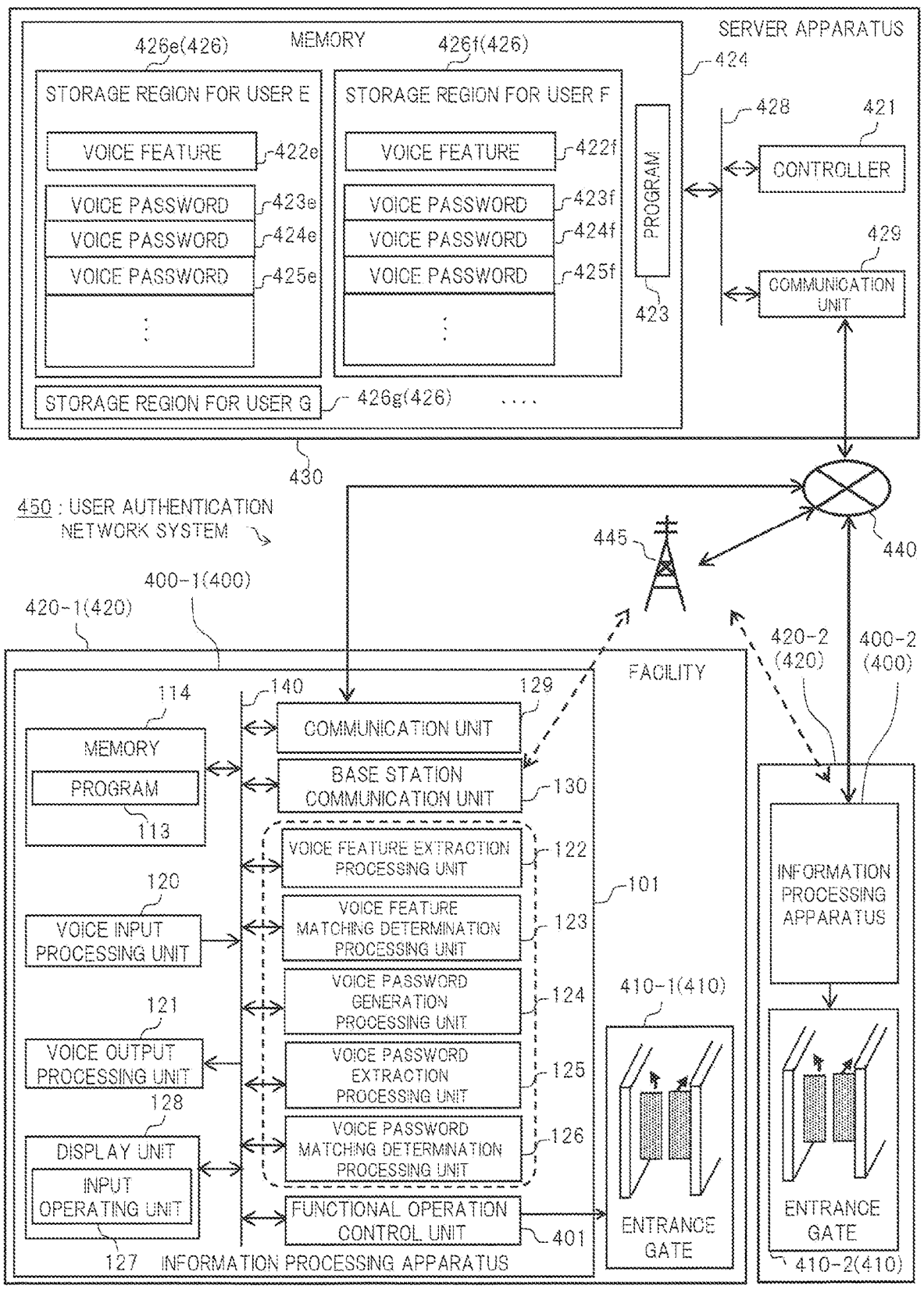
FIG. 5 is a block diagram illustrating one example of a configuration of a user authentication network system according to a second embodiment of the present invention.

FIG. 5 is a block diagram illustrating one example of a configuration of the user authentication network system according to the second embodiment of the present invention. A user authentication network system 450 illustrated in FIG. 5 includes information processing apparatuses 400 (for example, 400-1, 400-2), a server apparatus 430, and an external network 440. The external network 440 connects each of the information processing apparatuses 400 to the server apparatus 430.

The information processing apparatus 400 (for example, 400-1, 400-2) are respectively included in facilities 420 (for example, 420-1 to 420-2). The facilities 420 (for example, 420-1 to 420-2) respectively include the information processing apparatuses 400 (for example, 400-1 to 400-2), and entrance gates 410 (for example, 410-1 to 410-2), for example.

The entrance gates 410 are respectively arranged in the vicinity of the facilities 420, for example. Further, the information processing apparatuses 400 are respectively arranged in the vicinity of the entrance gates 410, and execute user authentication processing for a person who passes through the entrance gate 410 as an authentication target user. The authentication target user authenticated as a user is allowed to pass through the entrance gate 410, and can enter the facilities 420.

Note that a configuration of the facility 420-2 is similar to that of the facility 420-1. Hereinafter, the configuration of each of the facilities will be described by using the facility 420-1 as an example. The configuration of the information processing apparatus 400-1 is similar to the configuration of the information processing apparatus 100 according to the first embodiment. Differences between the information processing apparatus 400-1 and the information processing apparatus 100 is that the user information storage region 106 is not provided in the memory 114 and that a functional operation control unit 401 is added thereto.

The functional operation control unit 401 is a functional block for controlling an opened/closed state of the corresponding entrance gate 410-1. When the user authentication processing is completed by the information processing apparatus 400-1, the functional operation control unit 401 transmits an entrance gate control signal for switching the entrance gate 410-1 from a closed state to an opened state thereto. This makes it possible to allow the authentication target user thus authenticated to pass through the entrance gate 410-1.

The server apparatus 430 is an apparatus that manages information on already-registered users who are allowed to enter the facilities 420. As illustrated in FIG. 5, the server apparatus 430 includes a controller 421, a memory 424, a communication unit 429, and the like. The respective units constituting the server apparatus 430 are mutually connected to each other via a bus 428.

The memory 424 is a functional block for storing various kinds of information related to the server apparatus 430. The memory 424 stores therein various kinds of programs to be used by the controller 421 and various kinds of information on voice features and voice passwords for the respective registered users, for example. The memory 424 includes a program storage region 423 and a plurality of user information storage regions 426. The user information storage regions 426 correspond to those in the user information storage regions 106 illustrated in FIG. 1. Note that FIG. 5 illustrates user information storage regions 426e and 426g corresponding to users E to G who are the already-registered users.

The program storage region 423 is a storage region for storing various kinds of programs such as an OS or an application for an operation control. These programs are developed and executed by the controller 421.

The user information storage region 426e is a storage region for storing user information of the user E. The user information storage region 426e includes a voice feature storage region 422e for storing a voice feature of the user E, voice password storage regions 423e to 425e for respectively storing voice passwords of the user E, and the like, for example. The voice passwords that are different from each other are respectively stored in the voice password storage regions 423e to 425e. Note that the number of voice password storage regions may be less than or more than this in the similar manner to that of the information processing apparatus 100.

A user information storage region 426f is a storage region for storing user information of a user F. The user information storage region 426f includes a voice feature storage region 422f for storing a voice feature of the user F, voice password storage regions 423f to 425f for respectively storing voice passwords of the user F, and the like, for example.

The user information storage region 426g is a storage region for storing user information of a user G. Although it is not illustrated in the drawing, the user information storage region 426g also includes a voice feature storage region for storing a voice feature of the user G, a plurality of voice passwords storage regions for respectively storing voice passwords of the user G, and the like.

The communication unit 429 is a communication interface that is connected to the external network 440, and is configured to transmit and receive information to and from the information processing apparatus 400 via the external network 440. Specifically, a communication unit 129 of the information processing apparatus 400 is connected to the communication unit 429 of the server apparatus 430 via the external network 440 to transmit and receive information between the communication units.

Further, the information processing apparatus 400 may transmit and receive the information to and from the server apparatus 430 via a base station 445. Specifically, a base station communication unit 130 of the information processing apparatus 400 is connected to the communication unit 429 of the server apparatus 430 via the base station 445 and the external network 440 to transmit and receive information between the communication units.

The controller 421 is configured by a CPU or the like. The controller 421 executes the program stored in the memory 424 such as the OS or the application for the operation control, thereby controlling the respective units constituting the server apparatus 430, and executing an operation controlling process of the whole server apparatus 430.

At the time of a user registering process, the controller 421 receives a voice feature and voice passwords of a registration target user, which are transmitted from the information processing apparatus 400, via the communication unit 429 to store them in the memory 424. Further, at the time of the user authentication processing, the controller 421 transmits the voice feature and the voice passwords stored in the memory 424 to the information processing apparatus 400 via the communication unit 429.

<User Registering Process>

Next, the user registering process in the user authentication network system 450 will be described. Note that hereinafter, the user registering process will be described by using processes between the information processing apparatus 400-1 (the facility 420-1) and the server apparatus 430 as an example. However, the similar processes are also executed between each of the other information processing apparatuses 400 and the server apparatus 430.

FIG. 6 is a view illustrating one example of an operation sequence of the user registering process according to the second embodiment of the present invention. In FIG. 6, a left side thereof illustrates an operation of a registration target user, a center thereof illustrates an operation of the information processing apparatus 400-1, and a right side thereof illustrates an operation of the server apparatus 430. Note that in FIG. 6, the same reference signs are respectively assigned to Steps at which the similar processes to those in FIG. 2 are executed, and detailed explanation of the corresponding Steps will be omitted appropriately.

In the user registering process according to the present embodiment, processes at Steps S201 to S207, S212 to S215, and Steps S501 to S514 are executed. First, explanation of the respective processes from an input operation to start the user registering process by the registration target user (S201) to a process to extract a voice feature by the information processing apparatus 400-1 (S207) will be omitted.

When the process to extract a voice feature (a first voice feature) is executed, the information processing apparatus 400-1 transmits a transmission request for the voice feature to a server apparatus 403 so as to transmit voice features of all registered users stored in the server apparatus 430 to the information processing apparatus 400-1 (S501).

When the transmission request for the voice features of the registered users transmitted from the information processing apparatus 400-1 is received (S502), the server apparatus 403 transmits the voice features of all the registered users stored in the memory 424 to the information processing apparatus 400-1 (S503). Note that in a case where the registered user is managed for each of the information processing apparatuses 400 (the facilities 420), the server apparatus 430 transmits only the voice features of the registered users of the information processing apparatus (for example, 400-1) that executes the transmission request for the voice features.

When the information processing apparatus 400-1 receives the voice features transmitted from the server apparatus 403 (S504), the voice feature matching determination processing unit 123 compares and matches the voice feature extracted at Step S207 with each of the received voice features of the registered users (S505), and determines whether the extracted voice feature has already been registered or not (S506). In a case where it is determined that the extracted voice feature is not matched with any of the voice features of the registered users (N), the controller 101 determines that this registration target user is a newly registered user who has not been registered yet, and transmits the extracted voice feature to the server apparatus 430 (S507).

When the voice feature transmitted from the information processing apparatus 400-1 is received, the server apparatus 430 registers the received voice feature to a user information storage region 426, in which user information has not been registered yet, in the memory 424 (S508). Specifically, the controller 421 newly assigns this user information storage region 426 for the registration target user, and stores the voice feature of the registration target user in a voice feature storage region of the user information storage region 426 thus newly assigned. Then, the server apparatus 430 transmits registration completion notification, which notifies that registration and storage of the received voice feature is completed, to the information processing apparatus 400-1 (S509).

When the transmitted registration completion notification for the voice feature is received (S510), the information processing apparatus 400-1 generates a plurality of corresponding voice passwords on the basis of the registered voice feature, and transmits them to the server apparatus 403 (S511).

The voice password generation processing unit 124 generates a plurality of voice passwords for the newly registered user on the basis of the registered voice feature. Then, the information processing apparatus 400-1 transmits the plurality of voice passwords thus generated to the server apparatus 430 (S511).

When the plurality of voice passwords transmitted from the information processing apparatus 400-1 is received, the server apparatus 430 respectively stores the received voice passwords in voice password storage regions of the user information storage region 426 corresponding to the newly registered user (S512), and transmits registration completion notification, which indicates that registration and storage of the voice password is completed, to the information processing apparatus 400-1 (S513).

When the information processing apparatus 400-1 receives the registration completion notification of the voice password (S514), the user registering process is completed. The controller 101 of the information processing apparatus 400-1 notifies the registration target user (the newly registered user) that the user registration is completed by displaying it on a display unit 128, or emitting it from a voice output processing unit 121 (Step S212).

On the other hand, in a case where it is determined at Step S506 that the extracted voice feature of the registration target user is matched with any of the voice features transmitted from the server apparatus 430 (Y), the controller 101 determines that this registration target user is an already-registered user who has already been registered, and notifies the registration target user that the registration target user has already been registered by displaying it on the display unit 128, or emitting it from the voice output processing unit 121 (Step S214). Note that detailed explanation about Steps S212 to S215 will be omitted.

<User Authentication Processing>

Next, the user authentication processing according to the present embodiment will be described. Note that hereinafter, the user authentication processing will be described by using processes between the information processing apparatus 400-1 (the facility 420-1) and the server apparatus 430 as an example. However, the similar processes are also executed between each of the other information processing apparatuses 400 (the facilities 420) and the server apparatus 430.

FIG. 7 is a view illustrating one example of an operation sequence of the user authentication processing according to the second embodiment of the present invention. In FIG. 7, a left side thereof illustrates an operation of an authentication target user, a center thereof illustrates an operation of the information processing apparatus 400-1, and a right side thereof illustrates an operation of the server apparatus 430. Note that in FIG. 7, the same reference signs are respectively assigned to Steps at which the similar processes to those in FIG. 3 and FIG. 4 are executed, and detailed explanation of the corresponding Steps will be omitted appropriately. Note that a main sequence S350 illustrated in FIG. 7 is similar to that illustrated in FIG. 4, and only Steps indicating a connection relationship between the main sequence and the outside of the main sequence are illustrated for convenience.

First, explanation of Steps S301 to S303 at the time of start of the user authentication processing from utterance of voice for authentication by the authentication target user (S301) to extraction of a voice feature of the authentication target user from a voice signal of the voice for authentication by the information processing apparatus 400 (S303) will be omitted.

Then, when the voice feature of the authentication target user is extracted, the information processing apparatus 400-1 transmits a transmission request for the voice feature to the server apparatus 430 so as to transmit the voice feature registered in the server apparatus 430 to the information processing apparatus 400-1 (S601).

When the transmission request for the voice feature is received from the information processing apparatus 400 (S602), the server apparatus 430 transmits the voice feature registered in the memory 424 to the information processing apparatus 400-1 (S603).

When the voice feature transmitted from the server apparatus 403 is received, for example, the information processing apparatus 400-1 temporarily stores the received voice feature in a RAM of the controller 101 or the memory 114 (S604).

The voice feature matching determination processing unit 123 compares and matches the voice feature extracted at Step S303 with each of the voice features of the already-registered users received from the server apparatus 430 (S304), and determines whether the extracted voice feature has already been registered or not (S305).

In a case where the voice feature matching determination processing unit 123 determines that the extracted voice feature of the authentication target user is matched with any of the voice features received from the server apparatus 430 (Y), the controller 101 narrows down the already-registered user (for example, the user E) corresponding to the voice feature matched with the voice feature of the authentication target user as a specific user who becomes an authentication target by the voice password (S306). When the specific user (for example, the user E) is narrowed down, the information processing apparatus 400-1 transmits a transmission request for voice passwords of the specific user to the server apparatus 430 (S605).

When the server apparatus 430 receives the transmission request for the voice passwords from the information processing apparatus 400-1 (S606), the controller 421 respectively reads out all of the voice passwords from the plurality of voice passwords storage region (423e to 425e) corresponding to the user E, and transmits the voice passwords thus read out to the information processing apparatus 400-1 via the communication unit 429 (S607).

When the voice passwords transmitted from the server apparatus 430 are received, the information processing apparatus 400-1 temporarily stores the received voice passwords in the RAM of the controller 101 or the memory 114, for example (S608).

Then, the controller 101 randomly selects one voice password from the received voice passwords of the specific user (the user E) (S307).

On the other hand, in a case where the voice feature matching determination processing unit 123 determines at Step S305 that the extracted voice feature is not matched with any of the voice features received from the server apparatus 430 (N), the controller 101 notifies the authentication target user that user authentication is impossible by displaying it on the display unit 128, or emitting it from the voice output processing unit 121 (S324).

After Steps S307 and S324, the respective processes included in the main sequence S350 illustrated in FIG. 4 are executed. Of these, at Step S320, for example, the authentication target user may touch an acknowledge button displayed on the display unit 128, thereby notifying the information processing apparatus 400-1 that completion of the user authentication processing is recognized.

Then, when the authentication target user recognizes that the authentication processing is completed, the functional user operation control unit 401 transmits the entrance gate control signal for switching the entrance gate 410-1 from the closed state to the opened state. This makes it possible to open the entrance gate 410-1, and allow the authentication target user thus authenticated to pass through the entrance gate 410-1 to enter the facility 420-1 (S610).

Note that at Step S319, after a predetermined waiting time elapses since the completion of the user authentication is notified, the process at Step S610 may be executed.

<Effect and the Like>

According to the present embodiment, the following effects can be obtained in addition to each of the effects according to the first embodiment, which have already been described. According to the present embodiment, the voice features and the voice passwords of the registered users are stored in the server apparatus 430 provided at a location separated from the information processing apparatus 400, and the information processing apparatus 400 receives the voice features and the voice passwords from the server apparatus 430 via the external network 440. According to this configuration, it is possible to execute the user authentication processing by receiving the voice features and the voice passwords stored in the server apparatus 430 even from the information processing apparatus 400 in any of the facilities 420 connected to the external network 440. Further, management of various kinds of information of each of the registered users is centralized.

Further, in the present embodiment, a cloud server may be used as the server apparatus. According to this configuration, it is possible to increase the capacity of the server apparatus 430, and this makes it possible to store more information on the already-registered users. In addition, it becomes possible to build and utilize a database of the already-registered users.

Further, in the present embodiment, the information processing apparatus 400 may also take in voice uttered by the registered user after the user authentication processing, update the voice feature at any time, and generate a new voice password on the basis of the updated voice feature. The updated voice feature and the new voice password are transmitted to the server apparatus 430, and are stored in the memory 424.

Note that the information processing apparatus 400 may store the generated voice password in the own memory 114 in consideration of the capacity of the server apparatus 430 and a communication status with the server apparatus 430.

Further, the control of opening the entrance gate 410 has been described as the user authentication network system in the present embodiment. However, the present invention is not limited to this. The user authentication network system can also be utilized for a location where a log-in process by a personal computer or the like is executed, and a location where entry management for a plurality of rooms is executed.

Further, in the examples illustrated in FIG. 1 and FIG. 4, the voice uttered by the registration target user or the authentication target user is used at the time when the user registering process or the user authentication processing is started. However, data information such as a user ID (identification) for specifying a user may be inputted in place of these voices.

In this case, at the time of the user registering process, the information processing apparatus 400 may match and determine whether the registration target user is an already-registered user or not on the basis of the inputted data information. In a case where it is determined that the registration target user is not an already-registered user, the information processing apparatus 400 may notify the registration target user to utter any voice (a predetermined voice password may be used). The information processing apparatus 400 may take in the voice uttered by the user; extract a voice feature from this voice to generate a voice password; and register this registration target user together with the voice feature and the voice password.

Further, at the time of the user authentication processing, the information processing apparatus 400 may match and determine whether the authentication target user is an already-registered user or not on the basis of the inputted data information. In a case where it is determined that the authentication target user is an already-registered user, the information processing apparatus 400 may randomly select one of voice passwords for the already-registered user to present the selected voice password to the authentication target user.

Further, the voice input processing unit 120 illustrated in FIG. 1 and FIG. 4 has been configured so as to take in the uttered voice by the microphone. However, as a method of taking in voice of a user, there is a method by bone conduction in addition to this method. The bone conduction is based on air conducted sound that travels in the air to vibrate an eardrum and is transmitted to an auditory nerve, that is, bone conducted sound in which vibration such as a vocal band is transmitted to a skull and then transmitted directly to the auditory nerve in response to sound collected from an ear. For example, in the head mounted display by which a display is mounted on a head, by mounting the head mounted display on the head, it is possible to take in a voice signal uttered by the user not only through the air conducted sound, but also through the bone conducted sound by bone conduction. In this case, the user registering process and the user authentication processing are also executed as well as the embodiment illustrated in FIG. 1 and FIG. 4.

Note that the present invention is not limited to the embodiments described above, and various modifications are contained. Further, the embodiments described above have been explained in detail for explaining the present invention clearly. The present invention is not necessarily limited to one that includes all configurations that have been explained.

Further, a part of the configuration of one embodiment can be replaced by a configuration of the other embodiment. Further, a configuration of the other embodiment can be added to a configuration of one embodiment. Further, a part of the configuration of each of the embodiments can be added to the other configuration, deleted, or replaced thereby. Note that each member and relative sizes described in the drawings are simplified and idealized in order to explain the present invention in an easily understood manner, and may have a more complicated shape in mounting.

REFERENCE SIGNS LIST

100, 400 . . . information processing apparatus, 101 . . . controller, 114 . . . memory, 120 . . . voice input processing unit, 424 . . . memory, 430 . . . server apparatus, 440 . . . external network, 450 . . . user authentication network system

The invention claimed is:

1. An information processing apparatus comprising:
a microphone;
a memory; and
a Central Processing Unit (CPU),
wherein the microphone is configured to take in a first voice uttered by a user of the information processing apparatus to convert the first voice into a first voice signal,
wherein the memory is configured to store programs that, when executed by the CPU, cause the CPU to:
extract a first voice feature from the first voice signal to compare the first voice feature with a voice feature of an already-registered user that has already been stored in the memory,
in a case where the first voice feature does not match the voice feature of the already-registered user with a degree of similarity exceeding a first threshold value, execute a process for storing the first voice feature in the memory so as to be associated with the user of the information processing apparatus, a process for generating a plurality of voice passwords based on the first voice feature, and a process for storing the plurality of voice passwords in the memory,
in a case where the first voice feature matches the voice feature of the already-registered user with the degree of similarity exceeding the first threshold value, execute a process for selecting a voice password from the plurality of voice passwords stored in the memory to present the selected voice password to the user of the information processing apparatus,
in response to that the microphone takes in a second voice uttered by the user of the information processing apparatus to convert the second voice into a second voice signal, execute a process for extracting a password from the second voice signal to compare the selected voice password with the extracted password,
in a case where the selected voice password matches the extracted password, execute a process for extracting a second voice feature from the second voice signal to compare the second voice feature with the voice feature of the already-registered user that has been stored in the memory,
in a case where the second voice feature matches the voice feature of the already-registered user with the degree of similarity exceeding a second threshold value, execute a process for notifying the user of the information processing apparatus that a user authentication processing is completed,
wherein the second threshold value is different from the first threshold value, and
wherein the CPU is configured to:
stop the user authentication processing in a case where the microphone does not take in a voice uttered by the user of the information processing apparatus within a predetermined time after presenting the selected voice password to the user of the information processing apparatus.

2. The information processing apparatus according to claim 1,
wherein the CPU is configured to select the voice password randomly from the plurality of voice passwords stored in the memory to present the selected voice password to the user of the information processing apparatus.

3. The information processing apparatus according to claim 1,
wherein the CPU is configured to update the voice feature of the already-registered user based on the second voice feature, generate a new voice password based on the updated voice feature, and store the updated voice feature and the new voice password.

4. The information processing apparatus according to claim 1, wherein the second threshold value is set to be narrower than the first threshold value.

5. A user authentication method by an information processing apparatus, the information processing apparatus comprising a voice input processing unit, a memory, and a controller, the user authentication method comprising:
taking in, by the voice input processing unit, a first voice uttered by a user of the information processing apparatus to convert the first voice into a first voice signal;
extracting, by the controller, a first voice feature from the first voice signal;
comparing, by the controller, the first voice feature with a voice feature of an already-registered user that has already been stored in the memory;
storing, by the controller, the first voice feature in the memory so as to be associated with the user of the information processing apparatus to generate a plurality of voice passwords based on the first voice feature in a case where the first voice feature does not match the voice features of the already-registered user with a degree of similarity exceeding a first threshold value;
storing the plurality of the voice passwords in the memory;
selecting, by the controller, a voice password from the plurality of voice passwords stored in the memory in a case where the first voice feature matches the voice feature of the already-registered user with the degree of similarity exceeding the first threshold value;
presenting, by the controller, the selected voice password to the user of the information processing apparatus;
taking in, by the voice input processing unit, a second voice uttered by the user of the information processing apparatus to convert the second voice into a second voice signal;
extracting, by the controller, a password from the second voice signal to compare the selected voice password with the extracted password;
extracting, by the controller, a second voice feature from the second voice signal to compare the second voice feature with the voice feature of the already-registered user that has been stored in the memory in a case where the selected voice password matches the extracted password; and
notifying, by the controller, the user of the information processing apparatus that user authentication processing is completed in a case where the second voice feature matches the voice feature of the already-registered user with the degree of similarity exceeding a second threshold value,
wherein the second threshold value is different from the first threshold value, and
wherein the controller is configured to:
stop the user authentication processing in a case where a microphone of the information processing apparatus does not take in a voice uttered by the user of the information processing apparatus within a predetermined time after presenting the selected voice password to the user of the information processing apparatus.

6. The user authentication method according to claim 5, further comprising:
stopping, by the controller, the user authentication processing in a case where the voice input processing unit does not take in a voice uttered by the user of the information processing apparatus within a predetermined time after presenting the selected voice password to the user of the information processing apparatus.

7. The user authentication method according to claim 5, wherein the second threshold value is set to be narrower than the first threshold value.

* * * * *